United States Patent [19]

Thompson

[11] Patent Number: 5,791,600
[45] Date of Patent: Aug. 11, 1998

[54] PRESSURIZED MODULAR SYSTEM FOR SPACE APPLICATIONS

[75] Inventor: Clark Thompson, Webster, Tex.

[73] Assignee: Spacehab Inc., Vienna, Va.

[21] Appl. No.: 666,728

[22] Filed: Jun. 18, 1996

[51] Int. Cl.[6] .................. B64G 1/10; B64C 1/00; B64C 1/06
[52] U.S. Cl. .................. 244/159; 244/120; 244/131
[58] Field of Search ................ 244/158 R, 159, 244/161, 118.1, 120, 131, 132; 52/79.1, 79.12, 81.2, 81.3

[56] References Cited

U.S. PATENT DOCUMENTS

| | | | |
|---|---|---|---|
| 4,562,979 | 1/1986 | Taylor | 244/159 |
| 4,715,566 | 12/1987 | Nobles | 244/159 |
| 4,867,395 | 9/1989 | Taylor et al. | 244/158 R |
| 4,872,625 | 10/1989 | Filley | 244/159 |
| 5,624,088 | 4/1997 | Fiore | 244/158 |
| 5,628,476 | 5/1997 | Soranno et al. | 244/158 |

FOREIGN PATENT DOCUMENTS 8601484  3/1986  WIPO .................. 244/172

*Primary Examiner*—Virna Lissi Mojica
*Attorney, Agent, or Firm*—Rossi & Associates

[57] ABSTRACT

The invention provides a modular system including one or more interchangeable pressurizable body sections, a front end cap and a rear end cap. A tendon array assembly is coupled between the front endcap and the rear endcap. The body sections are preferably coupled together by a flexible seal. The interchangeable pressurizable body sections may be preloaded prior to launch or left vacant for cargo retrieval from an orbiting facility. Once loaded, the various elements of the modular system may be easily assembled with other elements into a plurality of configurations. The modular system can be attached to an orbiting space structure or utilized within the cargo bay of the NSTS Orbiter to provide a wide range of mission objectives.

9 Claims, 5 Drawing Sheets

PRESSURIZED MODULAR SYSTEM FOR SPACE APPLICATIONS

FIELD OF THE INVENTION

The present invention relates generally to modules that are designed to be positioned in a space transportation vehicle, such as the National Space Transportation System (NSTS) Orbiter, to augment the internal pressurized volume of the space transportation vehicle or an orbital facility to which the vehicle is docked, or modules designed to form part of an orbiting manned space station facility. The invention relates more specifically to a module having a length and pressurized volume that can be varied to meet specific payload mission requirements.

BACKGROUND

Previous modules available for transport to Earth orbit aboard the NSTS Orbiter include the SPACELAB module and the SPACEHAB module. The SPACELAB module requires substantially the full use of the cargo bay of the NSTS Orbiter, as well as its payload capability, and is therefore generally limited to dedicated missions. The SPACEHAB module, as described in U.S. Pat. No. 4,867,395, the contents of which are incorporated herein by reference, was developed to some extent in response to the disadvantages associated with the SPACELAB module. The truncated SPACEHAB module includes flat end caps and a flat top panel that permit useful payload items to be attached to the outside of the module in addition to being carried within the module. While the SPACEHAB module can be readily co-manifested with other payloads within the cargo bay of the NSTS Orbiter, it has insufficient pressurized volume to carry all of the cargo required for certain missions, especially supply missions to facilities in highly inclined orbits such as the MIR space station or the planned International Space Station Alpha. Further, the SPACEHAB module was not originally intended to be utilized as a module that could be lifted from the cargo bay of the NSTS Orbiter to serve as a section of an orbiting space station, although modification for this purpose is potentially feasible.

The general concept of using interconnecting modules to form larger structures in Earth orbit has been previously proposed. U.S. Pat. No. 4,872,625 issued to Filley, for example, discloses a universal module assembly for space structures. A plurality of universal modules can be rigidly interconnected into a larger assembly. The modules are compatible with the NSTS Orbiter and are capable of on-orbit attachment with other modules in Earth orbit. The rigid coupling of the modules, however, induces high loads on the modules themselves and the NSTS Orbiter during launch and flight. Further, once assembled, access to the interior of the modules during ground processing is restricted to a hatch, which greatly increases the difficulty in accessing of the modules during ground processing for cargo loading.

In view of the above, it is an object of the invention to provide a modular system that can be readily reconfigured to meet the specific pressurized space and payload requirements for a wide variety of Earth orbit missions. It is a further object of the invention to provide a modular system that permits ready internal access for pre-flight ground processing and reduces loads on the modular system itself as well as the NSTS Orbiter.

SUMMARY

The invention provides a modular system including one or more interchangeable pressurizable body sections. The interchangeable pressurizable body sections may be pre-loaded prior to launch or left vacant for cargo retrieval from an orbiting facility. Once loaded, the various elements of the modular system may be easily assembled with other elements into a plurality of configurations. The modular system can be attached to an orbiting space structure or utilized within the cargo bay of the NSTS Orbiter to provide a wide range of mission objectives.

In a preferred embodiment, the completely assembled configuration of the modular system is in the general shape of a right circular cylinder with one truncated conical front endcap, one flat rear endcap, and a plurality of cylinder body sections. The cylinder body sections are coupled together by flexible seal sections that provide compliance to facilitate relative motion of adjacent elements of the modular system. The relative motion may be induced by the NSTS Orbiter structural attachments coupled to the cylinder body sections through the flexure of the NSTS Orbiter. In addition, the flexible seals constitute elements of a pressure tight enclosure. An external tendon array assembly, including a plurality of longitudinal tendons extending along the axial length of the modular system and dispersed about the perimeter thereof and transverse tendons extending across an outer face of the rear endcap, act against internal pressurization to maintain a constant module axial length while allowing relative motion between adjacent elements, thereby allowing the NSTS Orbiter to flex without coupled loading.

The interior volume of the modular system is configured to accommodate a wide range of cargo and cargo holding means including standardized racks, lockers, drawings and other specialized payloads. Standoff structures, fixed to the cylinder body sections, provide a mounting mechanism for the standardized racks and other cargo holding means. In addition, the standoff structures provide means for distributing utilities such as electrical power, data lines, fluid lines to any of the cylinder body sections from the front endcap. In addition, the standoff structures preferably act as integral ducts for the deliver and return of ventilation air to and from the front endcap 14.

In a preferred configuration, the cargo holding means occupy all of the interior volume with the exception of an empty interior corridor in the shape of a right octagonal prism. The interior corridor volume offers crew access to cargo and the cargo holding means and provides adequate free volume to allow re-orientation of standardized racks or other cargo holding means. The cargo removed from an installed position may be passed through a hatch located symmetrically with respect to the cylindrical axis of the modular system.

The interchangeable elements of the modular system are easily arranged and outfitted while in pre-flight ground processing on Earth. The inherent accessibility offered by easily separable modular elements eases access throughout the modular system for placement of cargo ranging from large and cumbersome items to delicate precision pieces. The pre-integrated sections may then be mated in various arrangements resulting in an adaptable mass distribution for the integrated modular system, thereby offering improved manifest options and adaptability of the NSTS Orbiter. The adaptability extends to grouping of payloads in relation to each other on the NSTS Orbiter, and fosters improved net payload capacity for the NSTS Orbiter when carrying various payloads by allowing greater flexibility to meet vehicle loading requirements. Another significant manifesting benefit relates to the loads imparted to the NSTS Orbiter by various sub-elements of the modular system. Each cylinder body section preferably delivers loads to the NSTS Orbiter via integral trunnion and keel fittings. The compliant intermediate elements between the cylinder body sections limit the degree to which NSTS Orbiter induced loads are carried through the modular system structure, thereby limiting loading conditions on the modular system structure to those imparted by the modular system element itself and its cargo contents. This greatly reduces the complexity of the structural analysis required for the integrated NSTS Orbiter and flight assembly of the modular system. Finally, the ability to reduce the physical size of the modular assembly permits a matching of module capacity with cargo requirements. The modular system may be reduced to a practical minimum to accommodate changing cargo requirements. Minimizing unused module volume produces an increase in NSTS Orbiter capacity available to other uses. Thus versatility, ease of arrangement and access to sections and cargo, increase in efficiency of manifesting in the NSTS Orbiter are key features of the interchangeable modular system design.

BRIEF DESCRIPTION OF THE DRAWINGS

The invention will be described in greater detail with reference to the accompanying drawings, wherein.

DETAILED DESCRIPTION OF THE PREFERRED EMBODIMENTS

Figure 1:
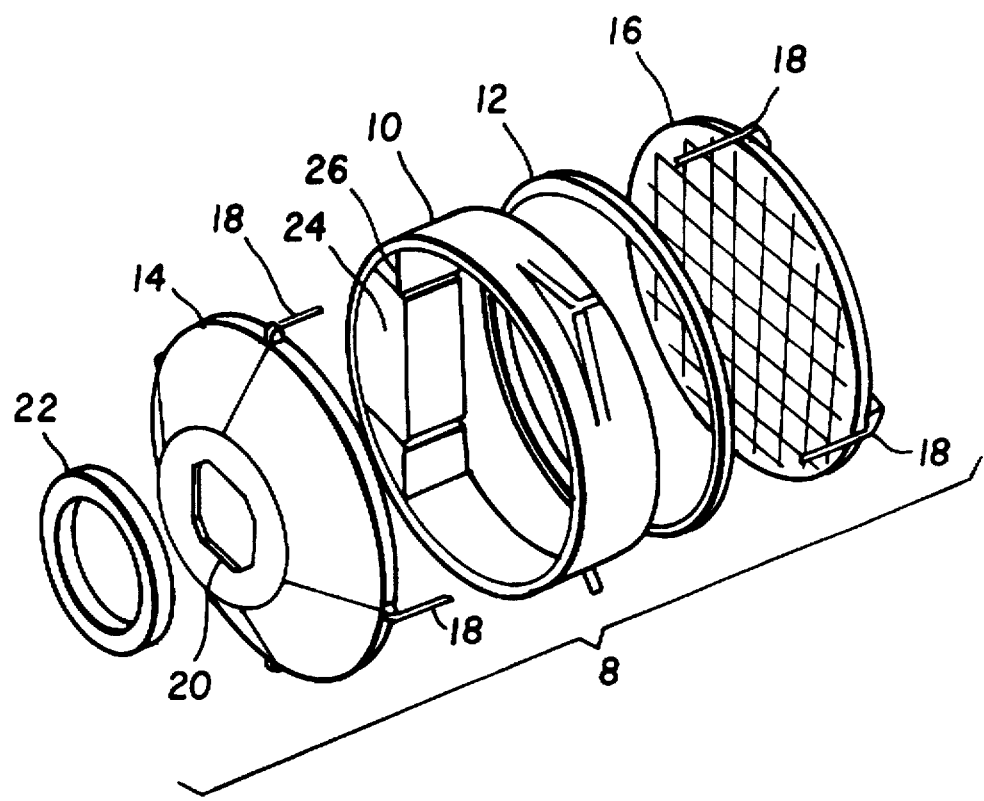
FIG. 1 is an exploded isometric view of the interchangeable elements comprising a modular system in accordance with the invention.

Referring now to FIG. 1, a modular system 8 in accordance with the invention includes at least one interchangeable circular cylinder body section 10, a flexible pressure seal 12 coupled between cylinder body sections 10 if more than one body section is utilized, a front bulkhead or endcap 14, a rear bulkhead or endcap 16, and a tendon array assembly 18. In the illustrated embodiment, the front endcap 14 is shaped in the form of a truncated cone and includes a hatch opening 20. A berthing mechanism, tunnel adapter or docking device 22 is coupled to the front endcap 14, thereby permitting the modular system to be coupled to a manned orbiting space station or to a pressurized crew compartment of an NSTS Orbiter. The circular and substantially flat rear endcap 16 is of a type generally described in U.S. Pat. No. 4,867,395, the content of which is incorporated by reference. Although the preferred illustrated embodiment utilizes a truncated cone front endcap 14 and a substantially flat rear endcap 16, other variations are possible including two truncated cone endcaps or two substantially flat endcaps. The tendon array assembly 18 includes longitudinal tendons and transverse tendons that will be described in greater detail below. Each of the cylinder body sections 10 is preferably adapted to carry standardized payload racks 24 or payload lockers 26 mounted on standardized standoffs. The racks 24 and lockers 26 are used to store cargo or to retain instrument payloads within the modular system 8.

Figure 2:
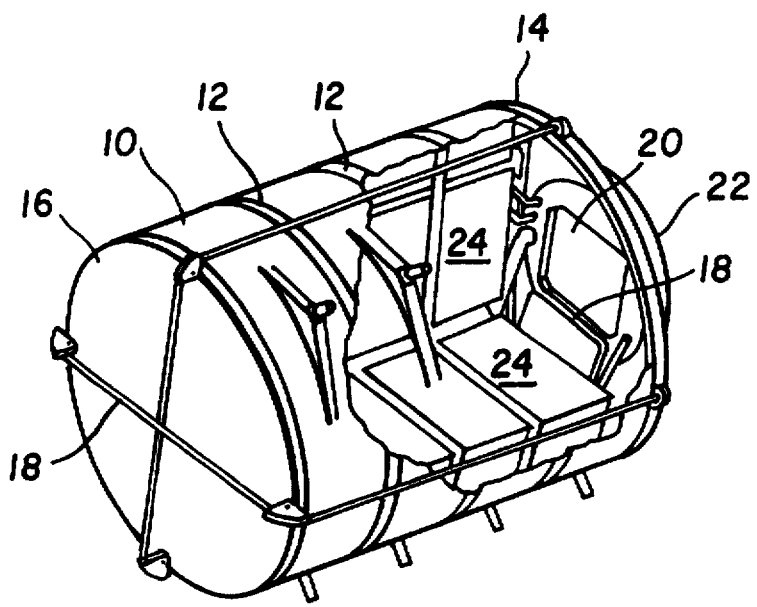
FIG. 2 is a partial cut away view of a modular system including four cylinder body sections.

FIG. 2 illustrates a partial cutaway isometric view of the modular system 8. A pressure sealing hatch 28 is attached to the front endcap 14 and mates with the hatch opening 20. The front endcap 14 further incorporates integral support structures to which various hardware, including utility conduits for electrical power, data lines and fluids lines, may be attached. Full access to the interior of the front endcap 14 during pre-flight ground processing prior to mating of the front endcap 14 to a cylinder section 10 facilitates installation of the hardware to the front endcap 14. The truncated cone front endcap 14 also provides a clear volume that is sufficient, in combination with the internal clear volume of an attached cylinder body section 10, to allow reorientation of a standardized rack 24 from its typically installed orientation, illustrated in FIG. 1, to an orientation where its long aspect is parallel to a central axis of the modular system, thereby allowing racks to be removed through the axially located hatch 28.

Figure 3:
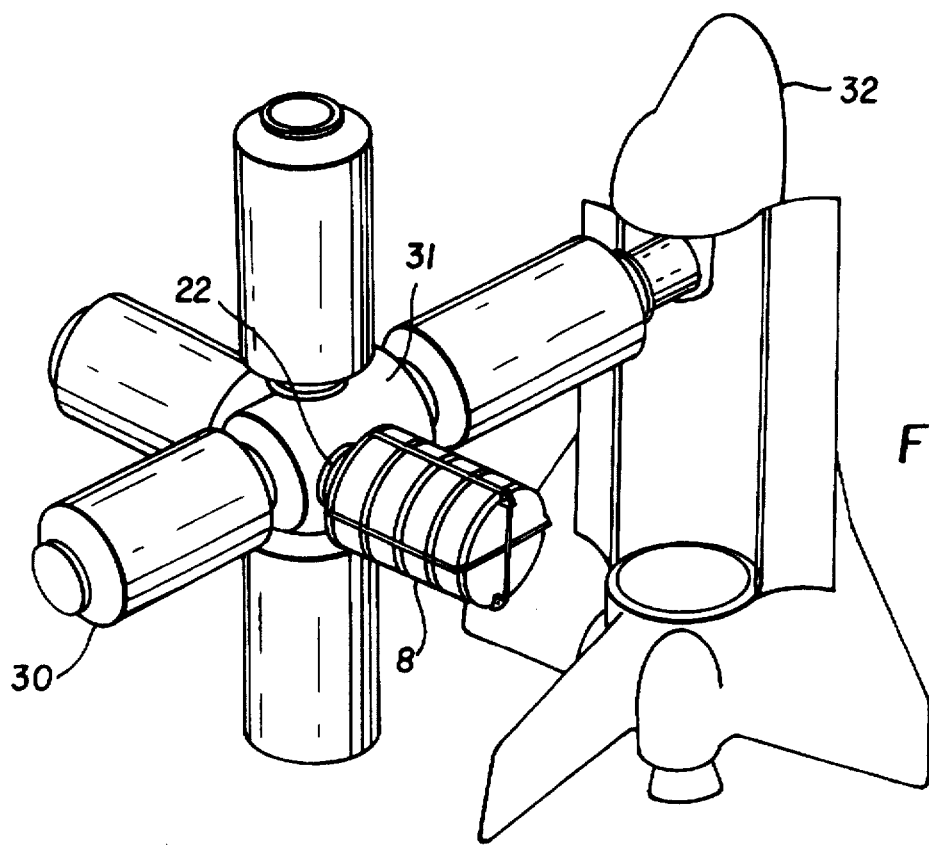
FIG. 3 is an isometric view of the modular system illustrated in FIG. 2 attached to an orbiting space station and delivered by an NSTS Orbiter.

FIG. 3 illustrates an isometric view of the modular system 8 attached to a manned orbiting space station 30. The modular system 8 is preferably lifted into orbit utilizing the NSTS Orbiter 32, and attached to the manned orbiting space station 30 using the remote manipulating system of the NSTS Orbiter 32. Specifically, the berthing mechanism 22 located on the front endcap 14 of the modular system 8 is mated with a berthing mechanism or docking module 31 of the manned orbiting space station 30, thereby allowing the modular system 8 to become an integrated module of the orbiting space station 30.

Figure 4:
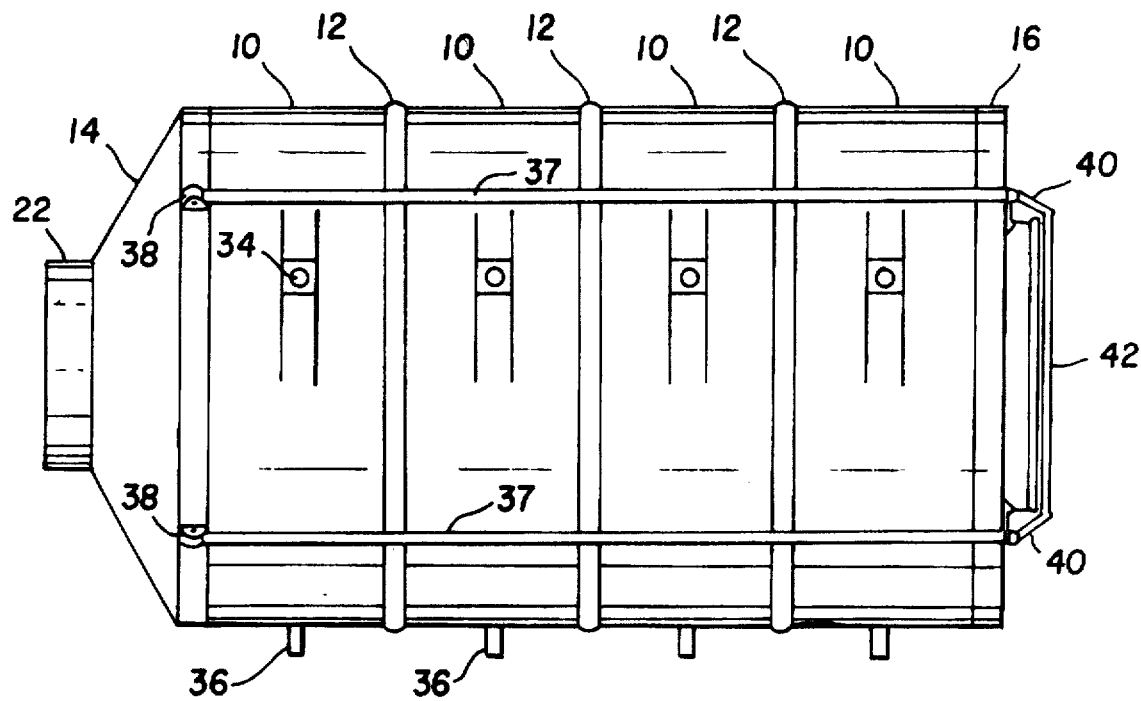
FIG. 4 is a side view of the modular system illustrated in FIG. 2.
Figure 5:
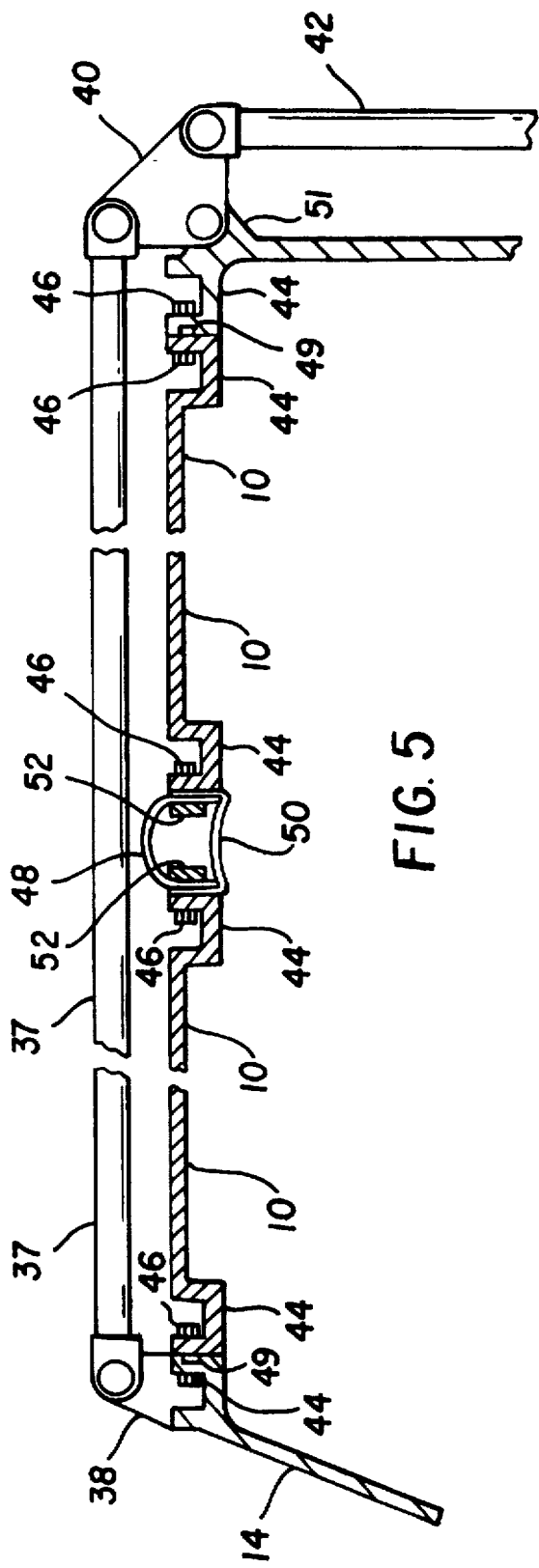
FIG. 5 is a cross-sectional view of the modular system illustrated in FIG. 4 showing the interconnection of various modular system components.

FIG. 4 is a side elevation view of the modular system 8 incorporating four cylinder body sections 10. Each of the cylinder body sections 10 preferably includes two trunnion pins 34 (one on each side) and a keel pin 36 that mate with standard receivers provided in the cargo bay of the NSTS Orbiter 32. Longitudinal tendons 37 of the tendon array assembly 18 preferably extend from static attachment or anchor points 38 on the front endcap 14 to a bell crank device 40 located on the rear endcap 16. Transverse tendons 42 are attached to the bell crank device 40 at both ends across the outer face 51 of the rear endcap 16. The longitudinal and transverse tendons 37, 42 are preferably manufactured as a metal tube or rod, although multi-strand or multi-element tendons incorporating tension devices are also possible. The connections for the longitudinal and transverse tendons 37, 42 are preferably ball type (although other connections may be employed) which allow displacement in two planes while restricting displacement in a third plane. The longitudinal tendons 37 and the transverse tendons 42 maintain the overall axial length of the modular system 8 and the mating surfaces between cylinder body sections 10, while allowing displacement between the cylinder body sections 10 in all other directions. Accordingly, torsional displacement in the modular system 8 is facilitated by the tendon array assembly 18.

Figure 6:
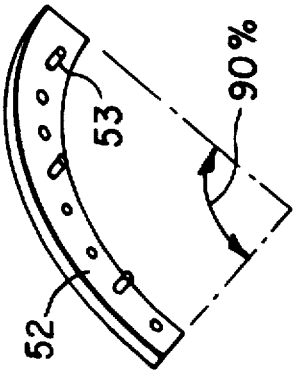
FIG. 6 is a detailed view of the compression ring illustrated in FIG. 5.

FIG. 6 is a cross-sectional view illustrating in greater detail the mating of various elements of the modular system 8. The front endcap 14, the rear endcap 16 and the cylinder sections 10 each include mating flanges 44. The front endcap 14 and the rear endcap 16 flanges 44 are coupled to the flanges 44 of adjacent cylinder sections 10 with a plurality of mechanical fasteners or bolts 46. The flanges 44 of the adjacent cylinder sections 10 or the flanges 44 of the front endcap 14 and the rear endcap 16 are provided with conformal gaskets 49 that are compressed by the force exerted by the mechanical fasteners 46. The flexible pressure seals 12 between cylinder body sections 10 preferably includes an outer flexible seal 48 and an inner flexible seal 50 held in compression between the flanges 44 of the cylinder sections 10 by compression rings 52 and mechanical fasteners 46, namely, the mechanical fasteners 46 screw into threaded fastener holes provided in the compression rings 52 thereby drawing the outer and inner seals 48, 50 into air tight sealing contact with the flange 44. The compression rings 52 are preferably radially segmented, as shown in FIG. 6, allowing installation within the inner flexible seal 50 and the outer flexible seal 48 without the need to stretch the outer flexible seal 48 or compressively deform the inner flexible seal 50. The outer and inner flexible seals 48, 50, compression rings 52 and flanges 44 of the cylinder sections 10 may be oriented and indexed during assembly via index pins 53 provided in the compression rings 54, illustrated in FIG. 7, which align with index holes provided in the flanges 44.

Figure 7:
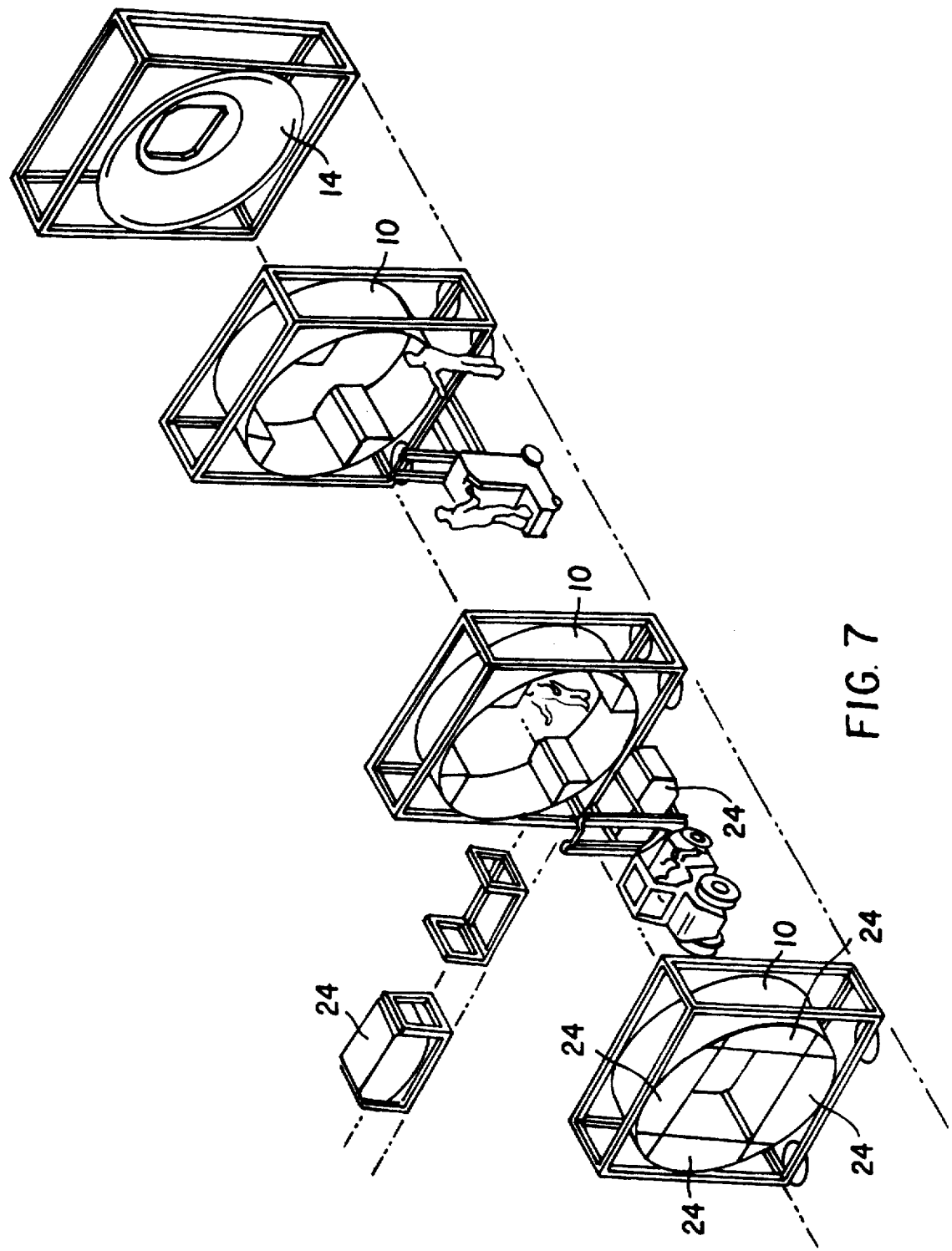
FIG. 7 illustrates ground processing operations in which individual cylinder body sections can be independently loaded prior to integration.
Figure 8:
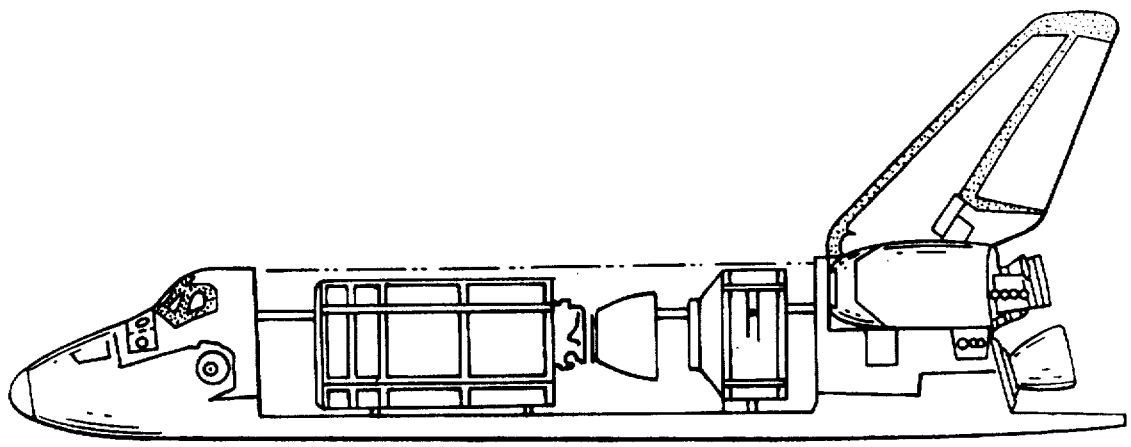
FIG. 8 illustrates a modular system in accordance with the invention including a single cylinder body section loaded in the cargo bay of an NSTS Orbiter with another payload.
Figure 9:
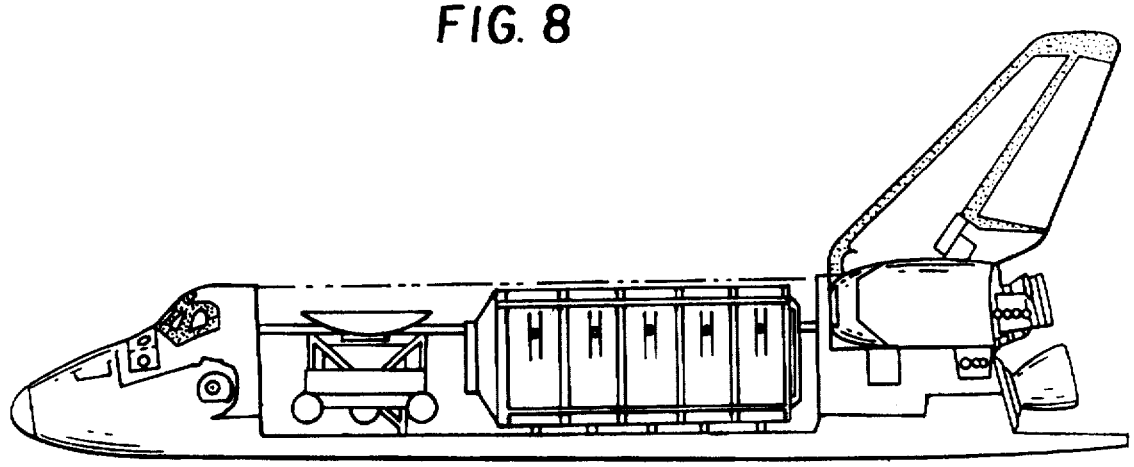
FIG. 9 illustrates a modular system in accordance with the invention including five cylinder body sections loaded in the cargo bay of an NSTS Orbiter with another payload.
Figure 10:
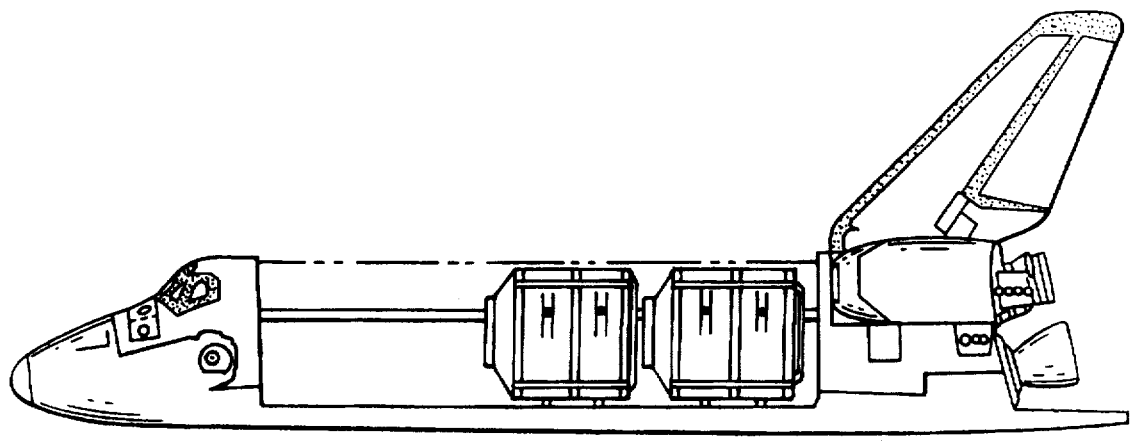
FIG. 10 illustrates to separate modular systems in accordance with the invention including two cylinder body sections.

The modular system 8 described above has a number of advantages. The elements of the modular system 8, for example, are fastened together in a manner that permits easy removal of at least one of the front end cap 14 and rear end cap 18 for pre-flight ground processing of cargo and equipment. Individual cylinder body sections 10 can also be easily preloaded prior to integrating the complete modular system 8 as illustrated in FIG. 7. The use of the external tendon array assembly 18 also permits full utilization of interior volume of the integrated modular system, so that standardized equipment racks can be located completely around the circumference of the cylinder body sections 10. Further, the use of the flexible pressure seals 12 between cylinder sections 10 allow the NSTS Orbiter to flex without coupled loading, thereby reducing stress on the modular system 8 and the NSTS Orbiter during launch and flight. Still further, one or more of the modular systems 8 can be loaded within the cargo bay of the NSTS Orbiter either alone or in combination with other payloads as illustrated in FIGS. 8–10.

The invention has been described with reference to certain preferred embodiments thereof. It will be understood, however, that modifications and variations are possible within the scope of the appended claims. For example, in applications where flexibility is not required of the modular system 8, the flexible pressure seals 12 between cylindrical sections 10 can be eliminated, and the flanges 44 of the cylindrical sections 10 can be directly coupled together with a gasket to provide sealing. The elimination of the flexible pressure seals 12 will also reduce the length of the modular system 8. The overall length of the modular system 8 can be further reduced, however, by utilizing fixed static anchors on the rear end cap 16 instead of the bell crank mechanism to hold the longitudinal tendons 36 and by eliminating the transverse tendons 42. In addition, other shapes for the body sections are possible other than the illustrated circular sections. Finally, the flexible sealing means can take any mechanical form, as long suitable flexibility is provided and a proper pressure seal is maintained.

What is claimed is:

1. An interchangeable pressurizable modular system comprising:

at least one body section, a front endcap; a rear endcap; and an external tendon array assembly coupled between the front endcap and the rear endcap; wherein the external tendon array assembly comprises a plurality of longitudinal tendons coupled between the front end cap and the rear endcap and transverse tendons coupled across the front endcap and the rear endcap.

2. An interchangeable pressurizable modular system comprising:

a plurality of interchangeable body sections; a front endcap coupled to a first body section of the plurality of body sections; a rear endcap coupled to a second body section of the plurality of body sections; and an external tendon array assembly coupled between the front endcap and the rear endcap;

wherein adjacent body sections of said plurality of body sections are coupled to each other by a flexible sealing means; and wherein the external tendon array assembly comprises a plurality of longitudinal tendons coupled between the front endcap and rear endcap and transverse tendons coupled across the front endcap and rear endcap.

3. An interchangeable pressurizable modular system comprising:

at least one body section; a front endcap; a rear endcap; and an external tendon array assembly coupled between the front endcap and the rear endcap;

wherein the external tendon array assembly comprises a plurality of longitudinal tendons and transverse tendons; and wherein the longitudinal tendons are coupled to the front endcap at fixed anchor points located on the front endcap and to the rear endcap by bell crank devices located on the rear endcap.

4. An interchangeable pressurizable modular system as claimed in claim 3, wherein the transverse tendons are coupled at each end to the bell crank devices.

5. An interchangeable pressurizable modular system as claimed in claim 2, wherein the sealing means comprises an outer seal member and an inner seal member.

6. An interchangeable pressurizable modular system as claimed in claim 5, wherein the sealing means further comprises compression rings that compress the outer and inner seal members to flanges of the adjacent body sections.

7. An interchangeable pressurizable modular system comprising:

a plurality of interchangeable body sections; a front endcap coupled to a first body section of the plurality of body sections; a rear endcap coupled to a second body section of the plurality of body sections; and an external tendon array assembly coupled between the front endcap and the rear endcap;

wherein adjacent body sections of said plurality of body sections are coupled to each other by a flexible sealing means;

wherein the external tendon array assembly comprises a plurality of longitudinal tendons and transverse tendons; and wherein the longitudinal tendons are coupled to the front endcap at fixed anchor points located on the front endcap and to the rear endcap by bell crank devices located on the rear endcap.

8. An interchangeable pressurizable modular system as claimed in claim 7, wherein the transverse tendons are coupled at each end by the bell crank devices.

9. An interchangeable pressurizable modular system as claimed in claim 2, wherein the body sections are of circular shape.

* * * * *